United States Patent
Andreasen

(10) Patent No.: US 10,784,662 B2
(45) Date of Patent: Sep. 22, 2020

(54) WEAK LINK LATCH

(71) Applicant: Balmoral Comtec Limited, Loirston, Aberdeen (GB)

(72) Inventor: Henrik Bang Andreasen, Bergen (NO)

(73) Assignee: Balmoral Comtec Limited, Loirston, Aberdeen (GB)

( * ) Notice: Subject to any disclaimer, the term of this patent is extended or adjusted under 35 U.S.C. 154(b) by 0 days.

(21) Appl. No.: 16/304,692

(22) PCT Filed: Jun. 6, 2017

(86) PCT No.: PCT/EP2017/063690
§ 371 (c)(1),
(2) Date: Nov. 27, 2018

(87) PCT Pub. No.: WO2017/211810
PCT Pub. Date: Dec. 14, 2017

(65) Prior Publication Data
US 2019/0181623 A1    Jun. 13, 2019

Related U.S. Application Data

(60) Provisional application No. 62/347,636, filed on Jun. 9, 2016.

(51) Int. Cl.
*H02G 1/10* (2006.01)
*H02G 9/02* (2006.01)
*H02G 1/08* (2006.01)

(52) U.S. Cl.
CPC ............ *H02G 1/10* (2013.01); *H02G 1/081* (2013.01); *H02G 9/02* (2013.01)

(58) Field of Classification Search
CPC .......................................................... H02G 1/10
USPC ....................................................... 174/70 C
See application file for complete search history.

(56) References Cited

U.S. PATENT DOCUMENTS

| 4,215,951 A * | 8/1980 | Knox ................. F16K 7/20 405/203 |
| 2015/0027987 A1 * | 1/2015 | Senne ................ H01H 33/022 218/94 |

FOREIGN PATENT DOCUMENTS

| WO | WO 2008/139190 | * 5/2007 | ............ H02G 3/04 |
| WO | 2008/013190 | 11/2008 | |

* cited by examiner

*Primary Examiner* — Stanley Tso
(74) *Attorney, Agent, or Firm* — SmithAmundsen LLC

(57) ABSTRACT

A weak-link latch for releasably pulling a cable (13) arranged in a conduit (14). The weak link latch is releasably connected to the conduit, and securely connected to the cable. A plurality of arms (4,5) extend laterally from a central member (1) arranged to engage the conduit, with at least one of which arms being a rotatable arm (5,19), rotatable about an axle (6) from an extended position in locked engagement with the conduit to a collapsed position disengaged from the conduit. A shear pin (7) is arranged between the rotatable arm (5,19) and the central member (1), the shear pin arranged to prevent rotation of the rotatable arm from the extended position to the collapsed position, said shear pin having a predetermined breaking force, said breaking force being a shear force due to rotational force from the rotatable arm.

5 Claims, 6 Drawing Sheets

WEAK LINK LATCH

FIELD OF THE INVENTION

The invention relates to cables, in particular to apparatus and methods for pulling cables such as offshore cables.

BACKGROUND

Cables, in particular cables used in the offshore industry, can be extremely long and heavy. The cables must often be pulled from one location to another, requiring great pulling forces up to several tons. In certain applications, cables are arranged concentrically inside a protective conduit that must also be pulled along with the cable. An example of such an application is cables stretched between offshore wind turbines and the like.

One method of pulling a cable arranged inside a protective conduit is to simply affix the cable inside the conduit so that it will not move relative to the conduit. A pulling line can then be attached to just the conduit, and the entire arrangement will follow.

In many applications, however, it is necessary that the cable be freely movable in the longitudinal direction inside the conduit. For example, when a cable is pulled from the foundation of one wind turbine to another, the protective conduit is pulled to, and enters an opening at the base of the foundation. The internal cable, however, must be pulled further up inside the foundation to a hang-off point, often located in a deck above the water surface. One solution to this problem known in the art is to use two separate pulling lines: one for the protective conduit and one (often longer line) for the cable. The conduit is thus pulled through the opening using its pull line, and thereafter the cable is pulled further up into the foundation using its pull-in line. This solution has many drawbacks however. Using two separate pull lines increases cost, complexity and chance of failure.

An alternate solution is to use a single pull-in line with a so-called weak link arrangement. An example of this is the arrangement described in EP2329174. As shown therein, a single pull-in line is connected to both the protective conduit and the internal cable by two separate wire leaders. The wire leaders have different breaking strength, with the leader attached to the conduit having a lower breaking strength than the leader for the cable. In use, the conduit is pulled until a protrusion thereon abuts the opening of the foundation. The cable is pulled with increasing force until the conduit's wire leader breaks. Thereafter, the cable can be pulled up into the foundation using its stronger leader.

A disadvantage with the solution from EP2329174 is that the wire leaders can break with pulling force in either direction. In a deep sea environment the uneven terrain and other situations can result in pulling forces in the opposite direction of the intended direction that breaks the conduit leader prematurely. In some instances it is desirable to pull the arrangement back in the opposite direction to correct deviations in the laying of the cable or other reasons. Consequently, in order to avoid failure, the wire leaders have to be over dimensioned.

SUMMARY OF THE INVENTION

The present invention has as its object to overcome one or more of the disadvantages of the prior art, or to provide an alternate weak link solution. It should be understood that while the invention will be described in the context of an offshore cable arranged inside a protective conduit, the invention is also useful for any situation where a single pull line is used to pull two separate bodies, and where a different pulling force is needed for the bodies.

According to one aspect, the present invention provides a weak link latch comprising an elongated central member having a connection point at a leading end for a pull line and a connection point at a trailing end. Projecting laterally from the central member are two or more arms, at least one of which is rotatable in the direction of the trailing end, from a first, extended lock position to a second, collapsed release position. The arms, when in the extended lock position are arranged to engage with a first pullable object, for example by engaging notches on the object itself or in a connection piece. A connection line connects the connection point at the trailing end of the central member to a second pullable object.

A shear pin having a predetermined breaking strength holds the rotatable arm in the extended lock position. Thus, a single pull line attached to the central member can pull both the first and second objects so long as the break strength of the shear pin is not exceeded. When the first object meets a resistance, for example when it contacts a structure at an intended first location, the pull line may then be pulled with increasing force until the shear pin breaks, which allows the rotatable arm to rotate to the collapsed release position whereby the arms disengage from the first object. The pull line—disengaged weak link—and connection line can thereafter together continue to pull the second object.

According to one aspect, the invention provides an arrangement for pulling cables arranged inside a protective outer conduit between offshore wind turbines or other structures. The arms of the weak link, in the extended lock position, engage notches in the interior surface of the front end of a cylindrical pull-in segment at the leading end of a protective conduit. The weak link latch of the present invention is connected to the front of the segment as a nose piece. According to this aspect, the conduit is pulled into abutment with the opening at the base of a wind turbine foundation. The pull line is then pulled with increasing force until the shear pin breaks. The weak link nose piece then disengages from the pull-in segment, and the internal cable is pulled further into the foundation and up to a hang-off point. According to one aspect, a conical mantle is arranged about the central body, to form a nose piece useful to avoid snagging or the entry of unwanted foreign matter into the conduit.

According to one aspect of the invention, the one or more rotatable arms have means for preventing rotation in the direction of the leading end of the central member, thus preventing the shear pin from breaking if pulling forces come from the opposite of the intended direction of pull. Such means may include an abutment section on the arm that abuts against the central member in the direction of the leading end, or an obstruction device that prevents rotation in the direction of the leading end of the central member. In this manner, only pulling forces in the forward direction will be capable of breaking the shear pin.

BRIEF DESCRIPTION OF THE DRAWINGS

The invention will now be described in detail with reference to the accompanying figures, wherein.

DETAILED DESCRIPTION

Figure 1:
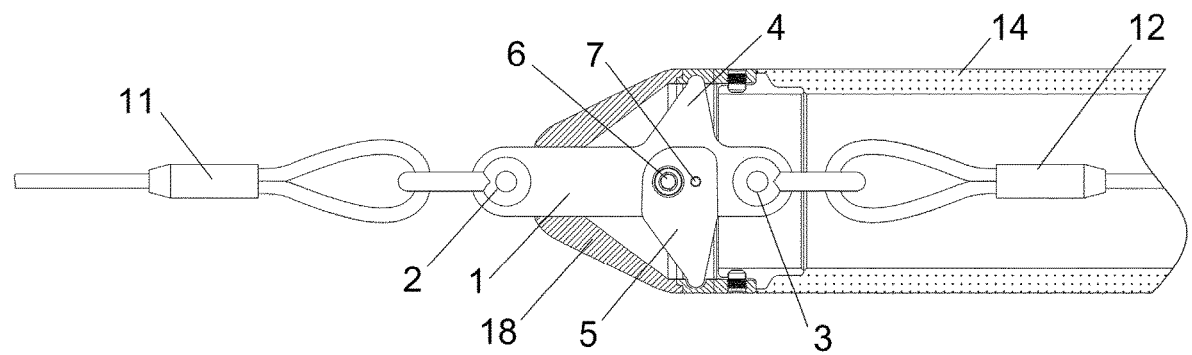
FIG. 1 is a side cross sectional view of the weak link latch of the invention engaging a pull-in segment of a conduit

According to one aspect and as shown in the figures, the invention provides a weak link latch comprising an elongated central member 1. The central member has a first connection point 2 at a leading end of the central member, for example a connection hole or ring. The central member has a second connection point 3 at a trailing end of the central member.

Two or more locking arms project laterally from the central member, at least one of which is rotatable. FIGS. 1-7 illustrate a first embodiment where only one of said arms is rotatable. According to the aspect, a rigid arm 4 extends laterally on one side of the central member while a rotatable arm 5 projects from the opposite side of the central member. Arm 5 is rotatable about an axle member 6. Rigid arm 4 is, according to one aspect, an extension of the material of the central member, but may alternatively be a separate component rigidly affixed to the central member.

A shear pin 7 passes through an opening in rotatable arm 5 to central member 1. The shear pin has a predetermined breaking force.

Figure 2:
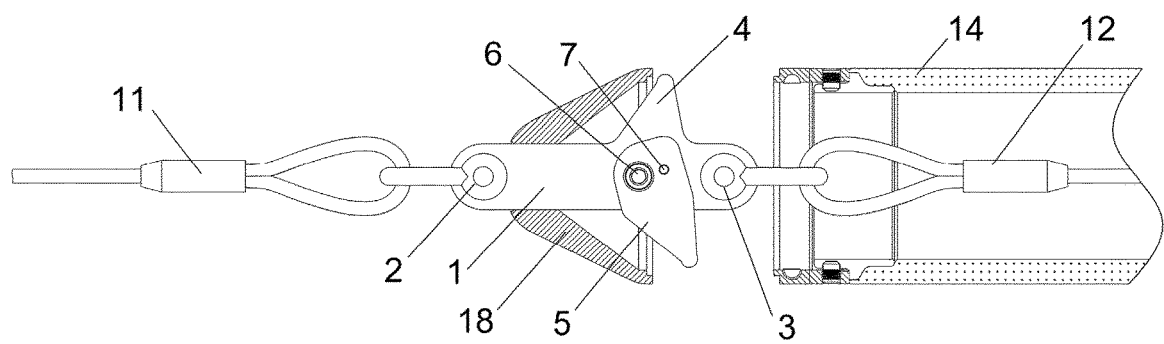
FIG. 2 is a side cross sectional view from FIG. 1, with the weak link latch disengaging from the pull-in segment
Figure 7:
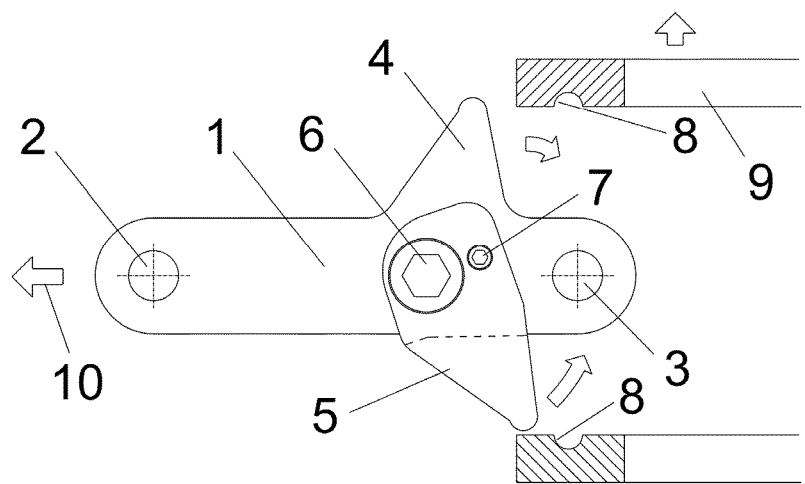
FIG. 7 is a side elevational view of a first embodiment of the invention from FIG. 6, disengaged from the object
Figure 8:
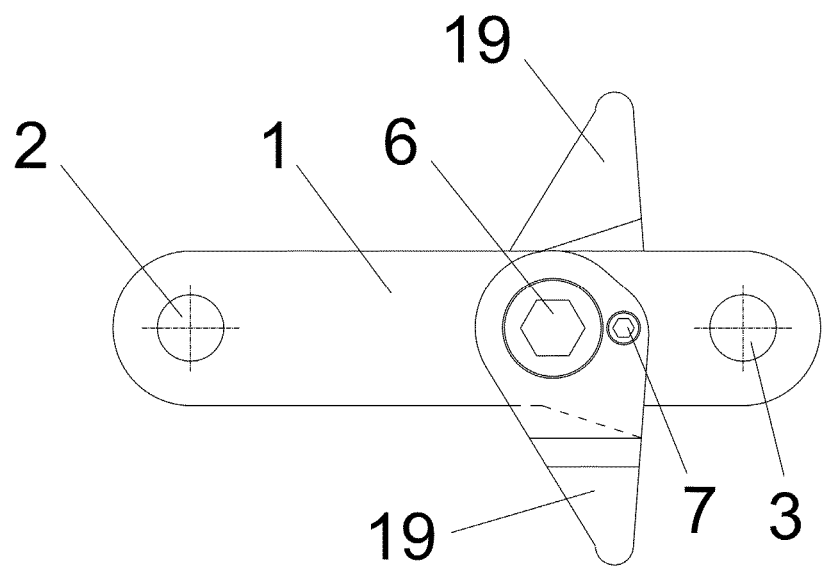
FIG. 8 is a side elevational view of a second embodiment of the invention
Figure 9:
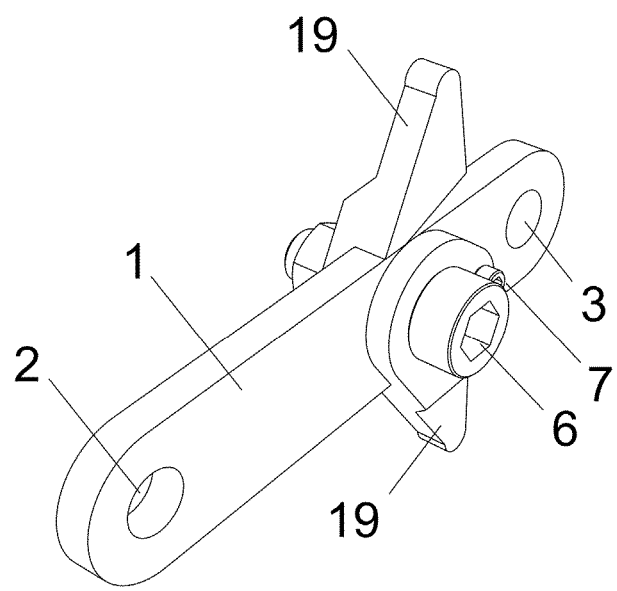
FIG. 9 is a perspective view of a second embodiment of the invention
Figure 10:
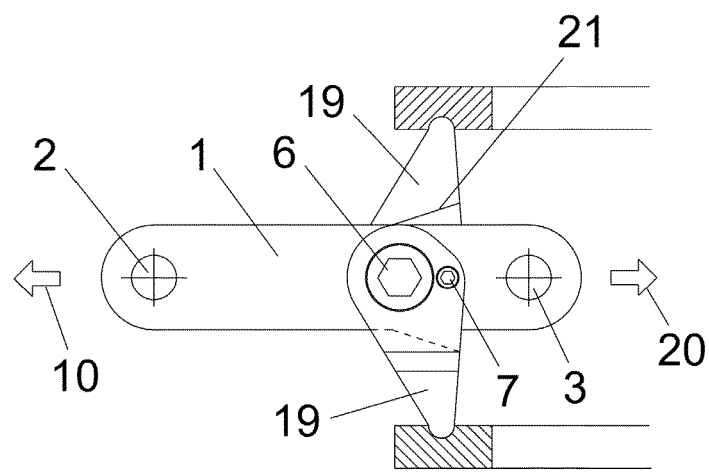
FIG. 10 is a side elevational view of a second embodiment of the invention engaged with an object
Figure 11:
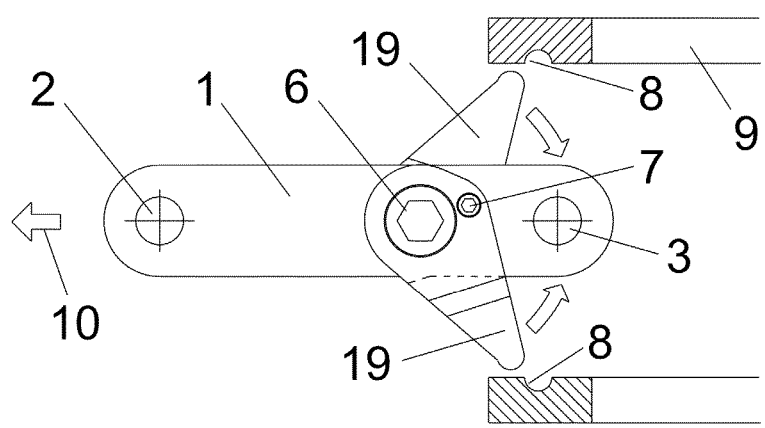
FIG. 11 is a side elevational view of a second embodiment of the invention from FIG. 10, disengaged from the object

The ends of the locking arms, when in a first extended and locked position, engage notches 8 as seen in FIG. 7 on the interior surface of a first pullable object 14,9, as shown in FIGS. 1 and 7 respectively. The arms are held in the locked position by shear pin 7. When a pulling force is exerted in an intended pulling direction 10 by a pulling line 11 connected to the first connection point 2, arm 5 will tend to rotate towards the trailing end of the central member, thus applying shear forces against the shear pin. When the breakage force of the shear pin is exceeded, the shear pin will break, allowing arm 5 to rotate about axle 6 to a collapsed, disengaged position, as shown in FIGS. 2 and 7. The central member is thus free to be pulled out of and past the first object 9. A connection line 12 connects a second pullable object, which can be pulled independent of the first pullable object.

Figure 3:
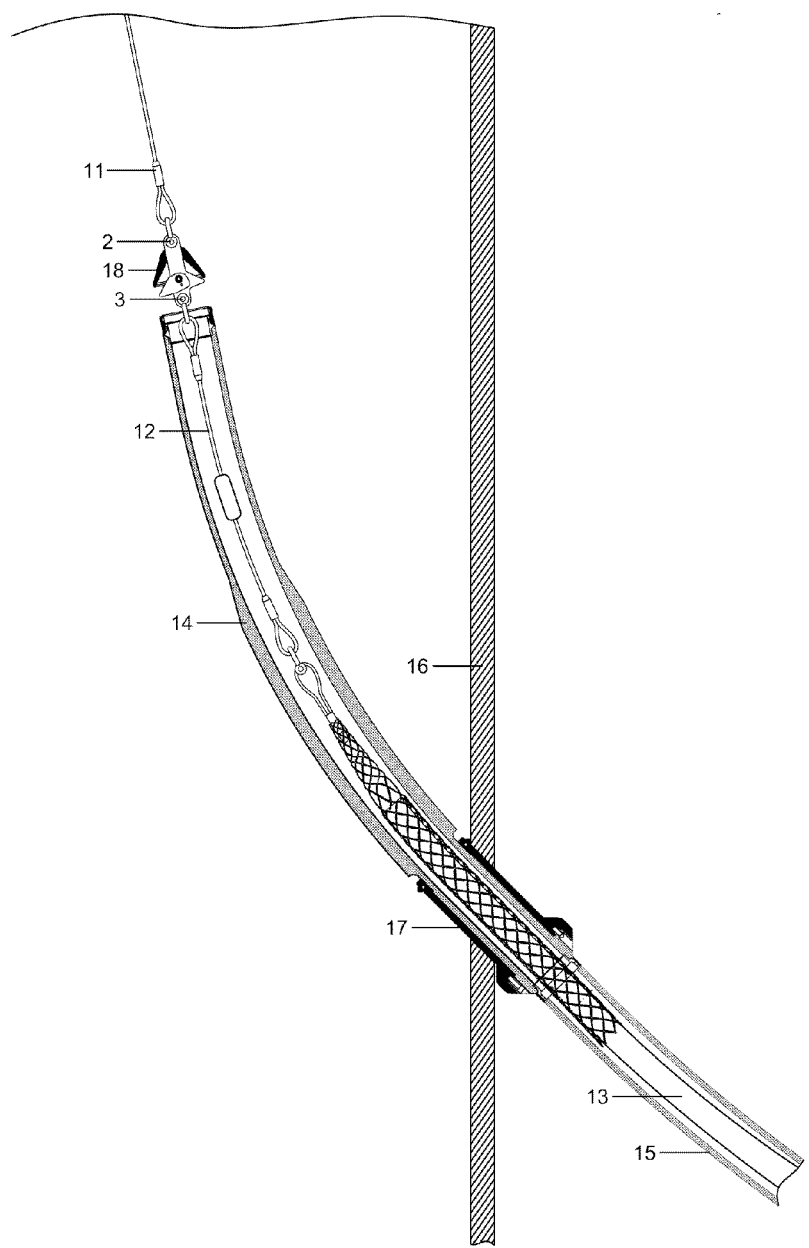
FIG. 3 is a side cross sectional view of the weak link latch of the invention in use for pulling a cable arranged in a conduit into a structure.
Figure 4:
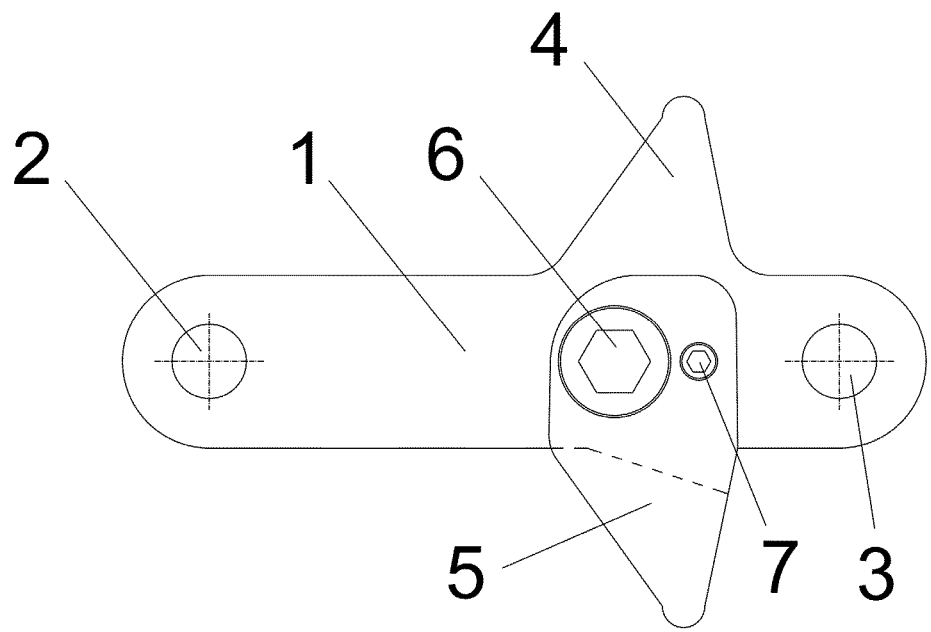
FIG. 4 is a side elevational view of a first embodiment of the invention
Figure 5:
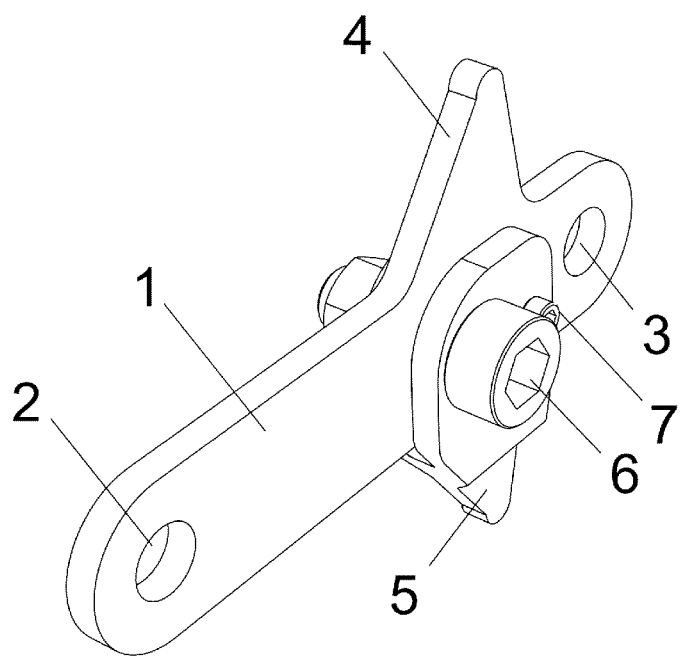
FIG. 5 is a perspective view of a first embodiment of the invention
Figure 6:
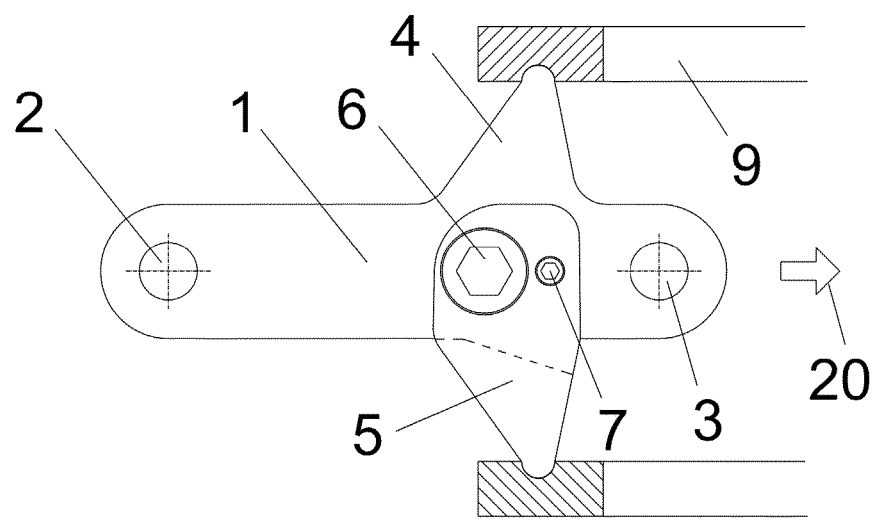
FIG. 6 is a side elevational view of a first embodiment of the invention engaged with an object

According to one aspect of the invention, the second pullable object is a cable 13 as shown in FIG. 3. In the embodiment illustrated in FIG. 3, the first pullable object is a cylindrical pull-in segment 14 attached to the leading end of a protective conduit 15 in which is arranged cable 13. Pulling line 11 pulls the engaged weak link latch, and thus the pull-in segment and cable, into an opening in the side of an offshore foundation 16. The pull-in segment 14 has an abutting member 17 that abuts against the opening in the foundation. The pulling force on line 11 is increased until shear pin 7 breaks, and the rotatable locking arm collapses to the disengaged position. Line 11 then continues to pull cable 13 further into the foundation and up to a hangoff point (not show), typically in a deck in the foundation above water level.

A conical mantle 18 a mounted about the central member such that the weak link device can function as a nose piece for the pull-in segment 14. The mantle helps prevent snags and keeps foreign matter from entering the conduit.

FIGS. 8-11 show an alternate embodiment where both arms are rotatable arms 19. In this embodiment, the shear pin 7 extends through central member 1 and engages both arms. When a pulling force is exerted in the pulling direction 10, both arms 19 will exert shear forces against the shear pin in a scissor like fashion.

According to another aspect of the invention, the rotatable arms, whether of the type in the first or second embodiment, have means that prevent rotation in the event a pulling force is exerted from an opposite pulling direction 20. According to one aspect, the means comprise an angled notch 21 on the inner face of the rotatable arm. As can be appreciated from in FIGS. 4-11, the notch is arranged such that, when the arms are in the extended and locked position, a forward edge of the notch abuts against central member 1, thus preventing rotation in the direction of the leading end. The angle of the notch permits, however, rotation towards the trailing end, until the rear edge of the notch comes to rest against the central member. Alternatively, the rotatable arms can be formed as forked members, with the forked extension engaging axle 6 on opposite sides of the central member. The point of the arms from which the forks diverge are arranged such that a forward edge rests against the central member in the locked position preventing rotation towards the leading end, and a gap between the forks allows rotation toward the trailing end.

What is claimed is:

1. A weak-link latch for simultaneously pulling, in a pulling direction, a cylindrical conduit and a cable, said cable being arranged to be longitudinally movable inside the conduit, wherein the weak-link latch is releasable from the conduit while remaining securely connected to the cable, wherein the weak-link latch comprises:

an elongated central member having a longitudinal axis extending between a leading end and a trailing end, a first connection point at the leading end and a second connection point at the trailing end, the first connection point arranged for attachment to a pull-line for pulling in the pull direction and the second connection point arranged for connection to the cable, a plurality of rigid rotatable arms extending from the central member in a radial direction with respect to the axis, said rigid rotatable arms having radially outer ends arranged, in a first radially extended position, to lockingly engage a groove in the interior surface at a leading end of the conduit, and wherein the plurality of rigid rotatable arms have radially outer end portions which are arranged in a common plane with the axis of the elongated central member, wherein the rotatable rigid arms are pivotally connected to the central member by a common pivot axle, the common pivot axle being perpendicular to the common plane, and wherein the rotatable rigid arms are pivotable around the common pivot axle in the common plane in a direction toward the trailing end of the elongated central member from the first radially extended position in which the radially outer end of the rotatable rigid arms are in locked engagement with the groove on the interior surface of the conduit to a second radially collapsed position in which the radially outer ends of the rotatable rigid arms are disengaged from the first groove on the interior surface of the conduit, wherein the rigid rotatable arms are held against rotation about the common pivot axis by a common shear pin arranged between the rigid rotatable arms and passing through the central member, the common shear pin arranged to prevent pivoting of the rotatable arm about the common pivot axle from the radially extended position to the radially collapsed position below a predetermined torque applied by the rotatable arms to the shear pin, and to permit pivoting of the rotatable rigid arms about the common pivot axle from the radially extended position to the radially collapsed position above said predetermined torque.

2. A weak-link latch according to claim 1, wherein the rigid rotatable arms each comprise an abutment portion arranged to prevent rotation of the arm in the direction of the first connection point.

3. A weak-link latch according to claim 2, wherein the abutment portion comprises an angled notch in each of the rigid rotatable arms, a forward end of said notch arranged to abut against central member when rotatable arm is in the extended position preventing rotation in the direction of the first connection point, the angle of the notch permitting rotation of the arm in the direction of the collapsed position.

4. A weak-link latch according to claim 1, further comprising a conical mantle arranged about central member, the mantle arranged to releasably connect to the leading end of the conduit as a nose piece.

5. A weak-link latch according to claim 1, wherein the second connection point is arranged to be connected to the cable via a connection line.

* * * * *